United States Patent [19]

Gee

[11] Patent Number: 4,763,393

[45] Date of Patent: Aug. 16, 1988

[54] HEATING DUCT ASSEMBLY TOOL

[76] Inventor: Elmer M. Gee, Box 54 River Isle, Bradenton, Fla. 34208

[21] Appl. No.: 49,093

[22] Filed: May 13, 1987

[51] Int. Cl.⁴ .......... B23P 19/04

[52] U.S. Cl. .......... 29/238; 29/243.5; 29/267; 81/488

[58] Field of Search .......... 29/267, 268, 238, 239, 29/243.5, 270; 81/488, 424; 254/15, 16, 113, 114, 131; 72/407, 409; 52/749, 127.5, DIG. 1

[56] References Cited

U.S. PATENT DOCUMENTS

| | | | |
|---|---|---|---|
| 177,100 | 5/1976 | Curry . | |
| 921,973 | 5/1909 | Gillett et al. . | |
| 1,839,255 | 1/1932 | Perkins . | |
| 1,877,620 | 9/1932 | Thoman et al. . | |
| 1,889,152 | 11/1932 | Phillips | 29/267 |
| 1,960,255 | 5/1934 | Tyroff | 29/267 |
| 2,247,780 | 7/1941 | Klammt . | |
| 2,291,020 | 7/1942 | Blomstrom | 254/15 |
| 2,342,068 | 2/1944 | White | 81/488 |
| 2,484,043 | 10/1949 | Malen | 29/267 |
| 2,736,088 | 2/1956 | Thygeson . | |
| 2,770,032 | 11/1956 | Kelly . | |
| 2,864,581 | 12/1958 | Harrison | 254/15 |
| 2,882,768 | 4/1959 | Nelson . | |
| 3,304,818 | 2/1967 | Heaton . | |
| 3,386,437 | 6/1968 | Treace | 29/238 |
| 4,305,195 | 12/1981 | Gould | 29/267 |
| 4,324,030 | 4/1982 | Diaz | 29/267 |
| 4,493,139 | 1/1985 | McClure . | |
| 4,646,409 | 3/1987 | De Casper | 29/243.5 |

OTHER PUBLICATIONS

Malco "Metalworking and Sliding Hand Tools and Accessories"—Duct Stretchers.

*Primary Examiner*—Robert C. Watson
*Attorney, Agent, or Firm*—Harness, Dickey & Pierce

[57] ABSTRACT

A duct assembly tool is disclosed including an elongated frame member; a member pivotally secured to the frame member, and a pair of wheels rotatably secured on the tool. One of the wheels is rotatably secured to the frame member and the other wheel is rotatably secured to the member. In use, the tool is in a first position such that the wheels are behind the assembly flanges of adjacent ducts. The frame member is pivoted, with respect to the pivot member, to a second position where the duct flanges are drawn together to enable positioning of a cleat over the flanges to secure adjacent ducts together.

19 Claims, 2 Drawing Sheets

FIG. 1.
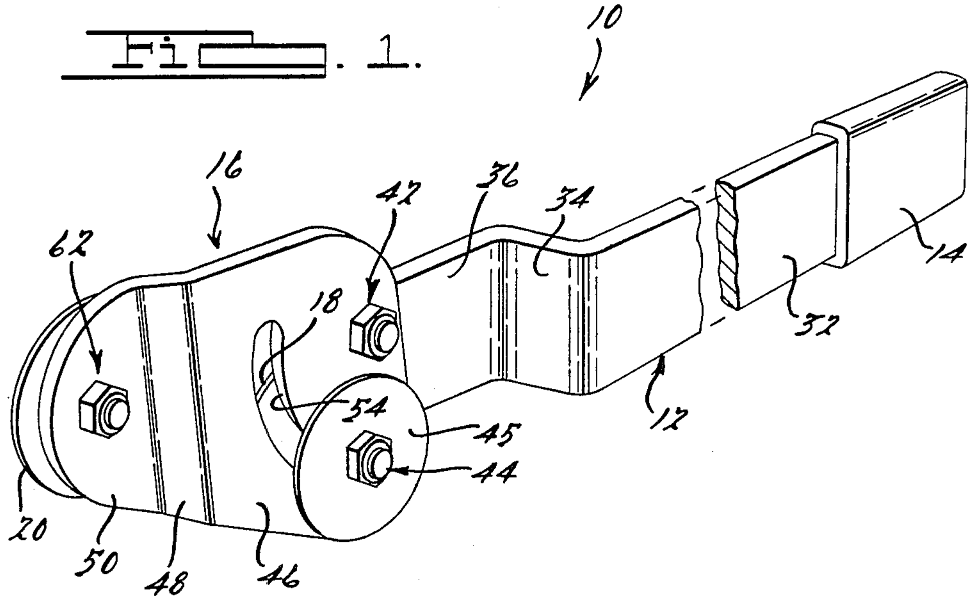
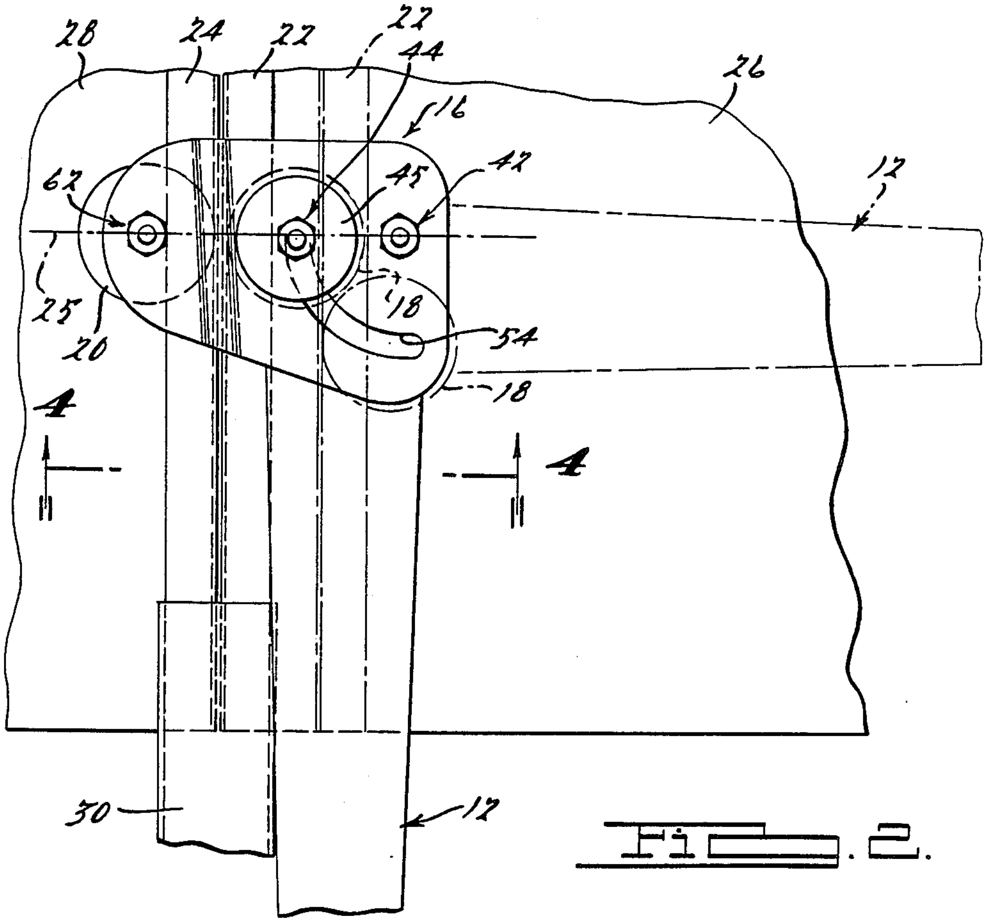
FIG. 2.

HEATING DUCT ASSEMBLY TOOL

BACKGROUND AND SUMMARY OF THE INVENTION

The present invention relates to heating and cooling duct work and, more particularly, to a duct assembly tool for drawing and clamping two pieces of duct work together.

Generally in the heating and cooling field, duct work is used to convey heated and cooled air. The duct work is normally hung from the building's ceiling or rafters. Generally, the ducts have a circular or rectangular shape, are fabricated from sheet metal material, and range in length from eight to twelve feet long. Particularly in rectangular shaped duct work, the ducts have assembly flanges on each end to enable a cleat to be positioned over the flanges to secure the ducts to one another.

Different types of tools are used to draw duct assembly flanges together in order to enable a cleat to be positioned onto the adjacent duct flanges. Generally when duct work is hung overhead, a gap is created between two adjacent ducts necessitating drawing the ducts together in order that a cleat may be positioned over the flanges to secure the ducts together. Tools for securing duct work and the like together are illustrated in U.S. Pat. Nos. 3,304,818; 2,736,088; 2,882,768; 1,839,255; 2,247,780; 921,973; 2,770,032; 1,877,620; 4,493,130; and 177,010. Also, duct tools are illustrated in the Malco tool catalog designated with reference DS1 and DS2. These tools have several disadvantages. One disadvantage is that the present tools are rigid and require exertion of large amounts of force to draw adjacent duct flanges together to enable a cleat to be positioned over the flanges.

Accordingly, it is an object of the present invention to overcome the disadvantages of the above art. The present invention enables the user to exert less force to draw two duct flanges together. The present invention provides the art with a tool having pivotal movement of one member with respect to the handle to draw adjacent duct flanges together. The present invention provides the art with a tool that clamps two adjacent ducts together which enables the operator to release the tool freeing his hands for other operations.

The present invention provides the art with a new and improved duct assembly tool. The present invention includes an elongated frame member; a member pivotably secured to the frame member; and a pair of wheels positioned on the frame and second members. One wheel is rotatably secured to the frame member and the other wheel is rotatably secured to the second member. The frame member is in a first position such that the wheels are positioned behind the two adjacent duct flanges. The frame member is pivoted, with respect to the pivot member, to a second position where adjacent duct assembly flanges are drawn and clamped together to enable positioning of a cleat over the flanges to secure adjacent ducts to one another.

From the subsequent description and claims taken in conjunction with the accompanying drawings, other objects and advantages of the present invention will become apparent to one skilled in the art.

BRIEF DESCRIPTION OF THE DRAWINGS

FIG. 1 is a perspective view of a duct assembly tool in accordance with the present invention.

FIG. 2 is a side elevational view of a duct assembly tool in accordance with the present invention.

DETAILED DESCRIPTION OF THE PREFERRED EMBODIMENT

Figure 3:
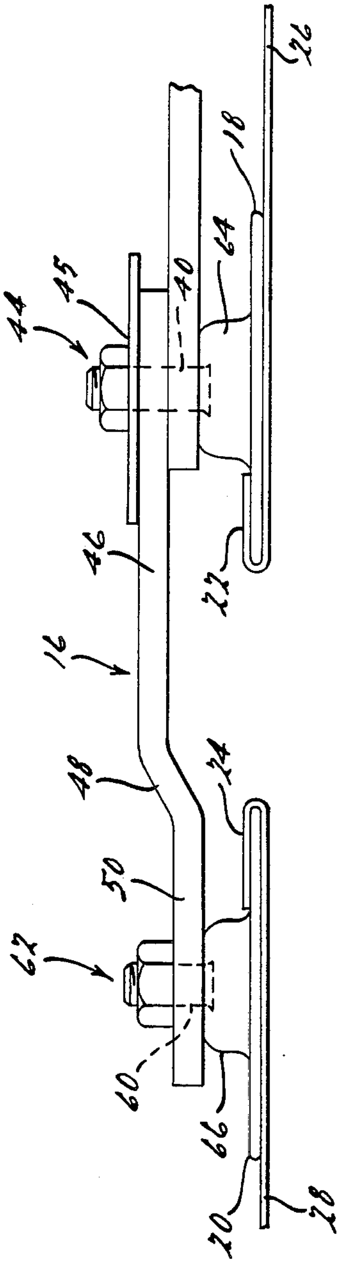
FIG. 3 is a partial side elevation view of the duct assembly tool of FIG. 2 in its first position.

Referring to the figures, a duct assembly tool is illustrated and designated with reference numberal 10. The duct assembly tool 10 includes a frame member 12, having a handle 14, and a member 16 secured to the frame member 12. A pair of wheels 18 and 20 are secured to the frame 12 and member 16, respectively. The wheels 18 and 20 are positioned behind the duct assembly flanges 22 and 24 to draw and clamp the ducts 26 and 28 together. As seen in FIG. 2, the tool 10 is moved from a first position, illustrated in phantom, with a gap formed between the adjacent ducts 26 and 28, to a second clamping position, where flanges 22 and 24 are drawn towards one another. A cleat 30 is positioned over the duct assembly flanges 22 and 24 to secure the ducts 26 and 28 together to form a unitary duct.

The frame member 12 includes a first elongated portion 32 including the handle 14, which is a resilient polymeric cover, secured onto one end of the elongated portion 32. The first portion 32 is generally planar having a second portion 34 integrally formed on one end and projecting annularly with respect to the first portion 32. The second portion 34 angles at a desired angle with respect to the first portion 32. The desired angle enables a user to position his hand away from the duct work so that the user's knuckles will not contact the duct work, eliminating injury. A third planar portion 36 is integrally formed with the second portion 34 and is substantially parallel to the first portion 32. The third portion 36 has a pair of apertures 38 and 40 to enable fasteners 42 and 44 to pass through the apertures 38 and 40 to secure the member 16 and wheel 18 to the third frame portion 36.

The member 16 has a first portion 46 which is substantially planar. A second portion 48 annularly projects from the first portion 46 and is integral with a third portion 50. The third portion 50 is planar and substantially parallel to the first portion 46. The first portion 46 has an aperture 52 and an arcuate slot 54. The aperture 52 enables the fastener 42 to pass through frame aperture 38 to pivotally secure the member 16 to the frame member 12. The slot 54 is positioned around fastener 44, which includes washer 45, to enable pivotal movement of the second member 16 with respect to the frame member 12. Also, an aperture 60 in the member third portion 50 enables a fastener 62 to be positioned through the aperture 60 to secure wheel 20 to the member 16.

Figure 4:
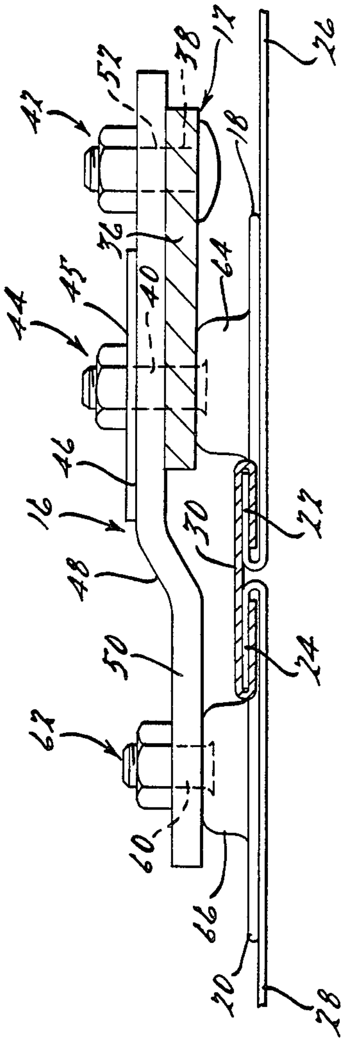
FIG. 4 is a cross-section view of FIG. 2 along line 4—4 thereof.

The wheels 18 and 20 are substantially identical and have projecting housings 64 and 66 to enable seating of the fasteners 44 and 62 in the wheels 18 and 20. The wheels 18 and 20 are substantially coplanar to one another when the member 16 is secured to the frame member 12 as seen in FIGS. 3 and 4. The coplanarness of the wheels 18 and 20 enables the wheels to be positioned behind the duct assembly flanges 22 and 24 to draw the flanges 22 and 24 together to enable securement of the ducts together in substantially the same plane, as seen in FIG. 4.

FIG. 3 illustrates a side elevation view of the duct assembly tool wheels 18 and 20 when the tool 10 is in its first position. The wheels 18 and 20 are positioned such that a gap is formed between the two wheels 18 and 20. The wheels 18 and 20 are positioned on the duct assembly flanges 22 and 24 as shown in phantom in FIGS. 2 and 3. The frame member handle 14 is pulled downward such that the frame member 12 pivots with respect to member 16. The downward pull and pivoting causes the flanges 22 and 24 to draw together such that one flange 22 is substantially drawn to the other flange 24, or visa-versa. Once the tool 10 has been pivoted, the wheels 18 and 20 are substantially adjacent to one another, as shown in FIG. 4. Thus, the downward pull on the frame member 12 from a horizontal position, with respect to the duct work, to a vertical position, causes the frame member 12 to pivot with respect to member 16 which, in turn, draws the flanges 22 and 24 together, as seen in FIGS. 3 and 4. The tool 10, in its vertical position, clamps the flanges 22 and 24 together. This clamping locks the tool 10 in place so that the tool 10 no longer requires manipulation by the operator to hold the tool 10 on the clamped duct work. Thus, the tool 10 holds the flanges 22 and 24 in place so that both of the operator's hands are free to perform other functions. Once the flanges 22 and 24 are drawn and clamped together, a cleat 30 is positioned over the flanges 22 and 24 to secure the ducts 26 and 28 together, as seen in FIG. 2.

The clamping and locking in the second position is enhanced by the arcuate slot 54. Once the tool 10 is moved to its second position, as seen in FIG. 2, fasteners 44 and 62 are substantially along line 65 or fastener 62 may be below line 65. In this second position, force in the ducts 26 and 28, from being drawn together, is exerted on a horizontal line with respect to the wheels 18 and 20. To release the tool 10 from its second position, force would have to be exerted vertically on member 16. A vertical force applied on member 16 would cause wheel 20 to move upward, releasing the flanges 22 and 24 from their adjacent position. However, since the arcuate slot 54 does not provide the member 16 with vertical movement until frame 12 is moved, the tool 10 remains locked in its second position which, in turn, clamps the flanges 22 and 24 together.

While the above summarizes the present invention, it will become apparent to one skilled in the art that modifications, variations, and alterations can be made to the present invention without deviating from the scope and fair meaning of the subjected claims.

What is claimed is:

1. A duct assembly tool comprising:
- an elongated frame member;
- a pivot member pivotally secured to said frame member; and
- a pair of wheels for enabling motion of the duct assembly tool along duct work, one of said wheels is rotatably secured to said frame member and the other of said wheels is rotatably secured to said pivot member wherein said wheels are positioned on adjacent duct work flanges when said frame member is in a first position with respect to said pivot member, in said first position said wheels and frame member are substantially aligned, said frame member is pivoted with respect to said pivot member to a second position wherein said wheels roll along said duct flanges to clamp together said duct flanges to enable positioning of a cleat over said flanges to secure two duct together, in said second position said wheels are aligned on a line that is substantially transverse to said frame member.

2. The duct assembly tool according to claim 1 wherein said frame member includes a handle to enable grasping of said tool.

3. The duct assembly tool according to claim 1 wherein said frame member includes a first elongated planar portion having two ends, one of said ends including a handle, a second planar portion integral with and angularly projecting from said other end of said first elongated portion, and a third planar portion integral with said second portion and substantially parallel with said first planar portion, said pivot member is secured to said third portion.

4. The duct assembly tool according to claim 1 wherein said pivot member includes an arcuate slot associated with said frame wheel to enable pivoting of said member.

5. The duct assembly tool according to claims 3 wherein said pair of fasteners secures one of said wheels and pivot member to said frame third portion.

6. The duct assembly tool according to claims 5 wherein said pivot member includes an arcuate slot having said frame wheel fastener positioned in said slot and said pivot member pivoting with respect to said frame third portion.

7. The duct assembly tool according to claim 3 wherein said pivot member includes a first planar portion pivotally secured to said frame third portion and having an arcuate slot, a second angular portion integrally associated with said first portion, and a third planar portion integral with said second angular portion and substantially parallel with said first planar portion, said third portion including said pivot wheel.

8. The duct assembly tool according to claim 1 wherein said wheels have a gap between each other in said first position and said wheels are substantially adjacent one another in said second clamped position.

9. A tool comprising:
- an elongated frame member;
- a pivot member pivotally secured to said frame member;
- a pair of wheels, one of said wheels is rotatably secured to said frame member, the other of said wheels is rotatably secured to said pivot member;
- an arcuate slot formed in said pivot member and associated with said frame wheel to enable pivotal movement of said frame member with respect to said pivot member;
- said wheels are positioned on said frame and pivot members such that said wheels are substantially coplanar to one another, wherein said wheels are positioned on adjacent flanges when said pivot member is in a first position with respect to said frame member and said frame member being pivoted with respect to said pivot member to a second position wherein said adjacent duct flanges are clamped together to enable positioning of a cleat over said flanges to secure two adjacent ducts together.

10. The duct assembly tool according to claim 9 wherein said frame member includes a first elongated planar portion having two ends, one of said ends including a handle, a second planar portion integral with and angularly projecting from said other end of said first elongated portion, a third planar portion integral with said second portion and substantially parallel with said first portion, said pivot member secured to said third portion.

11. The duct assembly tool according to claim 10 wherein a pair of fasteners secures one of said wheels and said pivot member to said frame third portion.

12. The duct assembly tool according to claim 9 wherein said wheel fastener is positioned in said arcuate slot of said pivot member and said pivot member pivoting with respect to said frame third portion.

13. The duct assembly tool according to claim 9 wherein said pivot member includes a first planar portion pivotally secured to said frame third portion and having said arcuate slot, a second angular portion integrally associated with said first portion, and a third planar portion integral with said second angular portion and substantially parallel with said first planar portion, said third portion including said wheel.

14. The duct assembly tool according to claim 9 wherein said wheels having a gap between each other in said first position and said wheels are adjacent to one another in said second position.

15. A duct assembly tool comprising:

an elongated frame member including a first elongated planar portion having two ends, one of said ends including a handle, a second planar portion integral with and angularly projecting from said other end of said first elongated portion, and a third planar portion integral with said second portion and substantially parallel with said first planar portion;

a member pivotally secured to said frame member third portion, said pivot member includes an arcuate slot associated with said frame wheel to enable pivoting of said member; and a pair of wheels, one of said wheels is rotatably secured to said frame member and the other of said wheels is rotatably secured to said pivot member wherein said wheels are positioned on adjacent duct work flanges when said frame member is in a first position with respect to said pivot member and said frame member is pivoted with respect to said pivot member to a second position wherein said duct work flanges are clamped together to enable positioning of a cleat over said flanges to secure two ducts together.

16. The duct assembly tool according to claim 15 wherein a pair of fasteners secures one of said wheels and pivot member to said frame third portion.

17. The duct assembly tool according to claim 15 wherein said frame wheel fastener is positioned in said slot and said pivot member pivoting with respect to said frame third portion.

18. The duct assembly tool according to claim 15 wherein said pivot member includes a first planar portion pivotally secured to said frame third portion and including said arcuate slot, a second angular portion integrally associated with said first portion, and a third planar portion integral with said second angular portion and substantially parallel with said first planar portion, said thrid portion including said pivot wheel.

19. The duct assembly tool according to claim 15 wherein said wheels have a gap between each other in said first position and said wheels are substantially adjacent one another in said second clamped position.

* * * * *

UNITED STATES PATENT AND TRADEMARK OFFICE

CERTIFICATE OF CORRECTION

PATENT NO. : 4,763,393

DATED : August 16, 1988

INVENTOR(S) : Elmer M. Gee

It is certified that error appears in the above-identified patent and that said Letters Patent is hereby corrected as shown below:

ON THE TITLE PAGE under U.S. Patent Documents Reference 177,100, "5/1976" should be --5/1876--;

ON THE TITLE PAGE under "Other Publications", "sliding" should be --siding--;

Col. 2, Line 15, "numberal" should be --numeral--;

Col. 4, line 4, "duct" should be --ducts--;

Col. 4, line 23, "claims" should be --claim--;

Col. 4, line 26, "claims" should be --claim--;

Col. 6, line 30, "thrid" should be --third--.

Signed and Sealed this

Fourteenth Day of March, 1989

*Attest:*

DONALD J. QUIGG

*Attesting Officer*

*Commissioner of Patents and Trademarks*